United States Patent
Fernandez

(10) Patent No.: US 12,536,923 B2
(45) Date of Patent: Jan. 27, 2026

(54) FOUR CHANNEL EEG SIMULATOR AND SIGNAL GENERATOR FOR ANESTHESIA

(71) Applicant: SmartTIVA, Inc., Rockville, MD (US)

(72) Inventor: Juan Fernandez, Rockville, MD (US)

(73) Assignee: SmartTIVA, Inc., Rockville, MD (US)

( * ) Notice: Subject to any disclaimer, the term of this patent is extended or adjusted under 35 U.S.C. 154(b) by 0 days.

(21) Appl. No.: 19/178,182

(22) Filed: Apr. 14, 2025

(65) Prior Publication Data
US 2025/0322770 A1    Oct. 16, 2025

Related U.S. Application Data

(60) Provisional application No. 63/633,275, filed on Apr. 12, 2024.

(51) Int. Cl.
G09B 23/30    (2006.01)
G09B 5/02     (2006.01)

(52) U.S. Cl.
CPC .............. *G09B 23/30* (2013.01); *G09B 5/02* (2013.01)

(58) Field of Classification Search
None
See application file for complete search history.

(56) References Cited

U.S. PATENT DOCUMENTS

| | | |
|---|---|---|
| 10,542,903 B2 | 1/2020 | Al-Ali et al. |
| 11,978,360 B2 | 5/2024 | Cadwell et al. |
| 2019/0374158 A1 | 12/2019 | Brown et al. |

FOREIGN PATENT DOCUMENTS

| | | | | |
|---|---|---|---|---|
| CN | 110840411 A | * | 2/2020 | .......... A61B 5/7203 |
| CN | 110859600 A | | 3/2020 | |
| KR | 20120131036 A | | 12/2012 | |
| WO | WO-2019127558 A1 | * | 7/2019 | .............. A61B 5/24 |

OTHER PUBLICATIONS

Eagleman, Sarah L., et al. "Offline comparison of processed electroencephalogram monitors for anaes-thetic-induced electroencephalogram changes in older adults." British Journal of Anaesthesia 126.5 (2021): 975-984.

Kreuzer, Matthias, et al. "Construction of the electroencephalogram player: a device to present electro-encephalogram data to electro-encephalogram-based anesthesia monitors." Anesthesia & Analgesia 104.1 (2007): 135-139.

Audette, W. E., et al. "Design and Demonstration of a Head Phantom for Testing of Electroencephalog-raphy (EEG) Equipment." Creare, Inc (2020).

* cited by examiner

*Primary Examiner* — James B Hull
(74) *Attorney, Agent, or Firm* — U. Maryland Carey School of Law

(57) ABSTRACT

A system may generate simulated EEG signals for anesthesia training and include a high-resolution integrated Digital-to-Analog converter (DAC) module, a file system with digitized clinical and simulated EEG signal datasets for medical subjects under anesthesia. A user may select a dataset or a generate signal mode in which the user provides target patient and anesthetic parameters and the system generates a simulation dataset based on that. Once the dataset is ready, the processor controls the signals to the DAC module based on the dataset to provide simulated EEG signals.

11 Claims, 8 Drawing Sheets

FOUR CHANNEL EEG SIMULATOR AND SIGNAL GENERATOR FOR ANESTHESIA

CROSS-REFERENCES TO RELATED APPLICATIONS

This application claims the benefit of U.S. Application Ser. No. 63/633,275, filed Apr. 12, 2024, the contents of which are hereby incorporated by reference.

BACKGROUND OF INVENTION

Field of the Invention

Medical devices, software for anesthesia monitoring, and tools for simulation and clinical training in anesthesia.

Background Technology

Electroencephalogram (EEG) monitoring for anesthesia has significantly evolved with advancements in signal processing, monitor technology, and the study of anesthesia's effects on EEG by recognized medical institutions. The development of monitors that analyze Density Spectral Analysis (DSA) graphs to interpret the effects of anesthetic drugs on the EEG is a significant leap forward. However, despite the availability of training tools for interpreting complex spectrograms, there lacks a comprehensive solution that can replicate a patient's EEG pattern under various scenarios on a real monitor screen.

SUMMARY OF THE INVENTION

A responsive EEG simulator and waveform generator is needed where commercial anesthetic brain monitors can be connected to control generated waveforms and visualize different spectrograms, numeric values, and suppression rates. Aspects of the present invention provide such simulation in various use modes, including recorded case reproduction, to enhance the simulation and clinical training in the field of anesthesia.

In some embodiments, there is provided a system for generating simulated EEG signals for anesthesia training including: a high-resolution integrated Digital-to-Analog converter (DAC) module configured to provide a plurality of analog signal outputs in a range of 0-100 µV; a tangible file system storing a plurality of EEG datasets including digitized simulated EEG signals for medical subjects under anesthesia and digitized clinical EEG signals for patients under anesthesia; and a processor in communication with the DAC module, the tangible file system, a user interface, tangible computer readable media containing processor executable instructions; wherein the processor is configured to read and execute the executable instructions and the instructions are configured to cause the processor to: in response to generating a prompt to a user, receive a mode indication from the user of a selection of a stored signal mode or a generate signal mode; in response to generating a prompt to the user, receive an indication from the user of a selected one of the plurality of EEG datasets to be a simulation dataset if the mode indication is stored signal mode; in response to generating prompts to the user, receive target patient and anesthetic parameters from the user and generating a simulation dataset based on the target patient and anesthetic parameters if the mode indication is generate signal mode; and provide control signals to the DAC module based on the simulation dataset.

In some aspects, the techniques described herein relate to a system wherein the target patient and anesthetic parameters include patient gender, patient age, patient weight, patient height, anesthetic, model, initial target, infusion mode, effect site/plasma concentration, and wake concentration.

In some aspects, the techniques described herein relate to a system further including a mannequin head having embedded conductive plates thereon, wherein each of the analog signal outputs is in electrical communication with one of the embedded conductive plates. The embedded conductive plates may be configurable for bilateral or single hemisphere monitoring.

In some embodiments, there is provided an apparatus for generating simulated EEG signals for anesthesia training including: a high-resolution integrated Digital-to-Analog converter (DAC) module configured to provide a plurality of analog signal outputs in a range of 0-100 µV; and an MCU including a processor and memory, said MCU in electrical communication with the DAC module and connectable to an external digital data source, the memory containing MCU executable instructions; wherein the MCU is configured execute the executable instructions and the instructions are configured to cause the MCU to: receive a digital data stream from the external digital data source representing time-varying simulated EEG signal amplitudes for a plurality of EEG signals; for each one of said plurality of EEG signals, control the DAC module to reproduce said EEG signal amplitudes on a corresponding one of said plurality of analog signal outputs.

In some aspects, the techniques described herein relate to an apparatus wherein the MCU further includes UART circuitry configured to implement a Universal Serial Bus connection with the external digital data source.

In some aspects, the techniques described herein relate to an apparatus further including a mannequin head having embedded conductive plates thereon, wherein each of the analog signal outputs is in electrical communication with one of the embedded conductive plates. The embedded conductive plates may be configurable for bilateral or single hemisphere monitoring.

In some aspects, the techniques described herein relate to an apparatus further including a connector socket in electrical connection with the DAC module, said connector socket compatible with standard EEG patient monitor cables.

In some embodiments, there is provided a method for generating simulated EEG signals for anesthesia training, the method including computer-implemented steps executed on a computing device of: providing a UI display on a display; in response to generating a prompt on the UI display, receiving a mode selection indication of a stored signal mode or a generate signal mode; in response to generating a prompt on the UI display, receiving an indication of selection of a simulation dataset selected from a plurality of datasets representing time-varying simulated digital EEG signal amplitudes for medical subjects under anesthesia and digitized time-varying clinical EEG signal amplitudes for patients under anesthesia if the mode indication is stored signal mode; in response to generating prompts on the UI, receiving target patient and anesthetic parameters and generating a simulation dataset representing time-varying simulated digital EEG signal amplitudes based on the target patient and anesthetic parameters if the mode indication is generate signal mode; and transmitting the simulation dataset as a digital data stream to the aforedescribed apparatus In some aspects, the techniques described herein relate to a method wherein the target patient and anesthetic parameters include patient gender, patient age, patient weight, patient height, anesthetic, model, initial target, infusion mode, effect site/plasma concentration, and wake concentration.

In some aspects, the techniques described herein relate to a method wherein the plurality of datasets are stored in one or both of a file store remote or local to the computing device. The UI display may include a DSA display corresponding to the simulation dataset.

In some aspects, the techniques described herein relate to a method, further including a step of: in response to generating prompts on the UI display, receiving a suppression/amplitude indication including one or both of a suppression percentage or amplitude ceiling and modifying the simulation dataset according to the suppression/amplitude indication if the mode indication is stored signal mode.

In some aspects, the techniques described herein relate to a method, further including a step of: in response to generating prompts on the UI display, receiving a static or dynamic indication and modifying the simulation dataset according to the static or dynamic indication if the mode indication is stored signal mode.

In some aspects, the techniques described herein relate to a method, further including a step of: displaying on the UI display a dynamic pharmacokinetic graph depicting drug concentration over time at an effect site based on the generated simulation dataset if the mode indication is generate signal mode.

In some aspects, the techniques described herein relate to a method, further including a step of: displaying on the UI display a cumulative graph of a total drug amount infused based on the generated simulation dataset if the mode indication is generate signal mode.

In some aspects, the techniques described herein relate to a method, further including a step of: in response to generating prompts on the UI display, receiving a dilution amount and dilution computation indication and modifying the simulation dataset according to the dilution amount and dilution computation indication if the mode indication is generate signal mode.

In some aspects, the techniques described herein relate to a method, further including a step of: in response to generating prompts on the UI display, receiving a bolus amount and bolus send indication and modifying the simulation dataset according to the bolus amount and bolus send indication if the mode indication is generate signal mode.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1A:
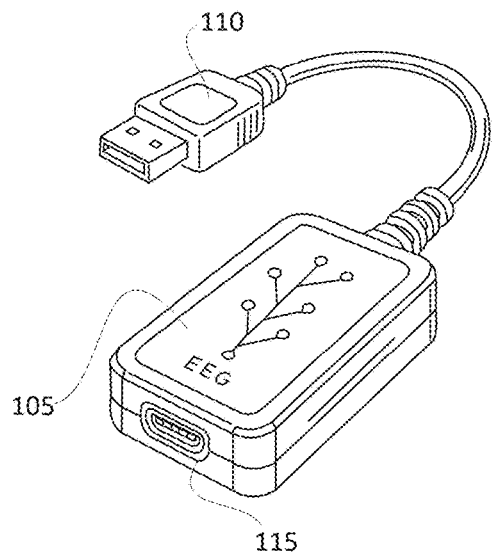
FIGS. 1A and 1B illustrate an exemplary embodiment of an EEG simulator in accordance with aspects of the invention.
Figure 1B:
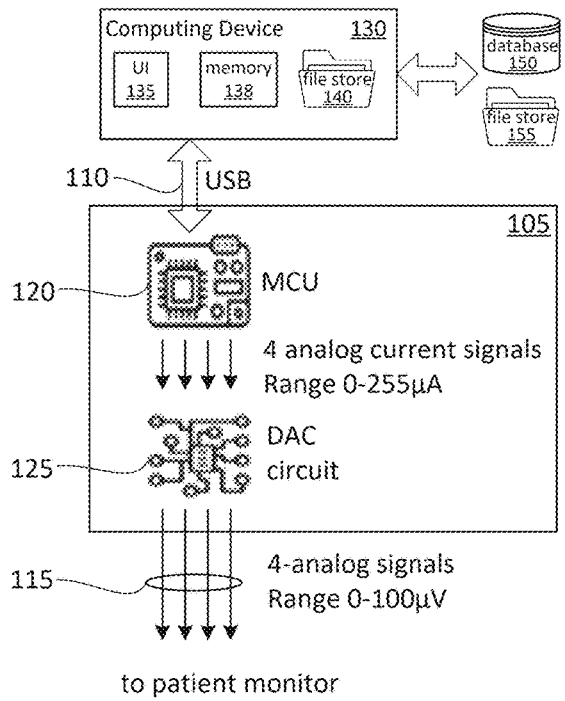
Figure 2:
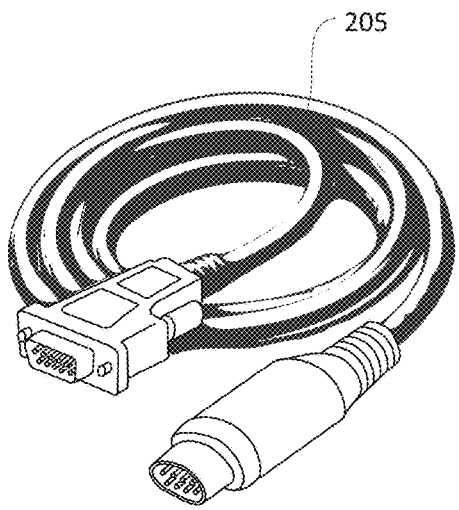
FIG. 2 illustrates an exemplary proprietary cable usable with various EEG and anesthesia monitor brands and models.

The present invention encompasses a comprehensive EEG simulation system for anesthesia monitoring and training, incorporating a hardware module 105 (as seen in FIGS. 1A and 1B), proprietary connection capabilities (as seen in FIG. 2), an optional electrode head 305 (FIG. 3) and advanced software functionalities (as detailed in FIGS. 4 to 8). The device is intended to generate 4 frontal EEG signals In one embodiment, with reference to FIGS. 1A and 1B, there may be an EEG simulator module 105 housing an electronic processor 120 and Integrated Digital-to-Analog converter (DAC) electronics 125. Module 105 may include an embedded USB or USB-C cable 110 for connection to a phone or PC, and multi-pin port 115 designed to connect to an EEG monitor.

Hardware Component: In one aspect, the system provides an electronic module 105, which is equipped with a high-resolution Integrated Digital-to-Analog converter (DAC) module 125 and a robust processor board 120. DAC module 125, featuring intricate micro-resistance circuits, is adept at replicating the nuanced microvolt signals characteristic of human EEG. This central module may interface with an external computing device 130, for example a PC or smartphone, via a USB port 110 using UART protocol, facilitating both power and data transmission through an embedded USB or USB-C cable.

External computing device 130 may include UI 135 components such as a display and input device such as one or more of a keyboard, touchscreen, or mouse. Computing device 130 may also include tangible computer readable memory 138 which stores processor executable instructions for carrying out the methods and systems disclosed herein. Computing device 130 may also include a file store 140 and also be in data communications with external database 150 and external file store 155.

FIG. 2 illustrates proprietary cable 205 tailored to interface with various EEG or anesthesia monitor brands and models, facilitating compatibility across different systems.

Figure 3:
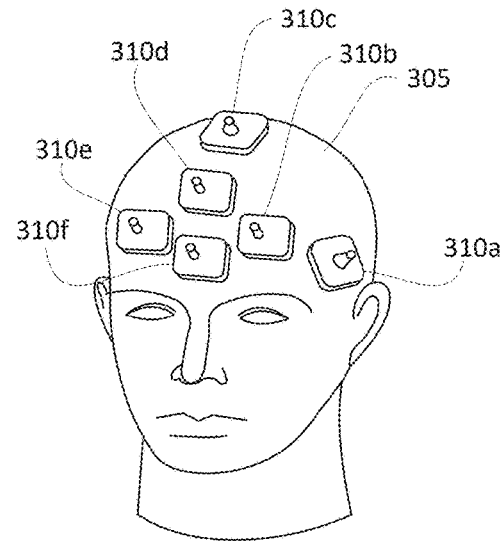
FIG. 3 illustrates a mannequin head featuring embedded conductive plates for placement of EEG sensors.

With reference to FIG. 3, in some embodiments, there may be a patient simulator mannequin head 305 featuring embedded conductive plates 310a-310f for placement of EEG sensors. In some embodiments, head 305 may house DAC electronics internally or may simply serve as a conduit for a cable connecting to module 105. In one embodiment, head 305 may include a USB cable (not shown) for direct connection to a PC or phone.

Conductive plates 310a-310f may be embedded in the forehead area. Plates 310a-310f are strategically placed to emulate standard EEG electrode positions, including four channels for signal electrodes and two reference or ground electrodes centrally located. Conductive plates 310*a*-310*f* are capable of receiving signals generated by electronic module 105, which can then be conveyed to a patient monitor through proprietary cables or directly via disposable electrodes from the monitor's manufacturer. Mannequin head 305 may be representative of an adult or pediatric subject and may be utilized as a standalone head or as part of a full-body simulator.

Figure 4:
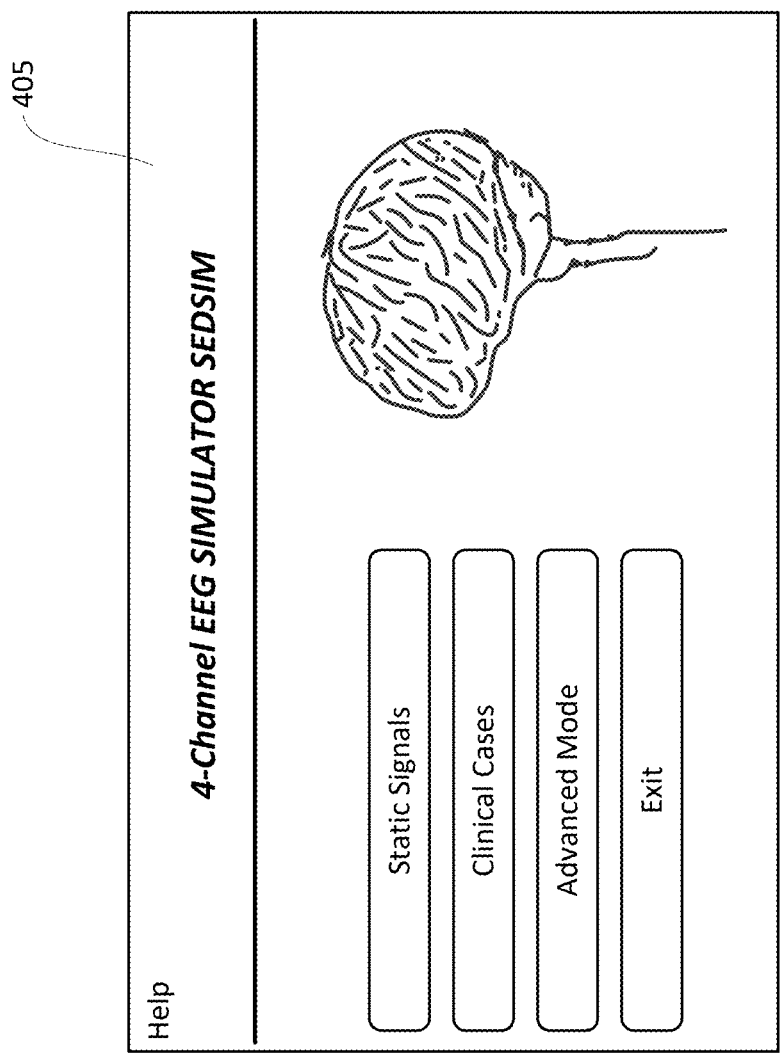
FIG. 4 illustrates an initial user interface presenting three user modes: Static Signals, Clinical Cases, and Advanced Mode.

FIG. 4 shows an initial software interface 405 presenting three user modes: Static Signals, Clinical Cases, and Advanced Mode.

Figure 5:
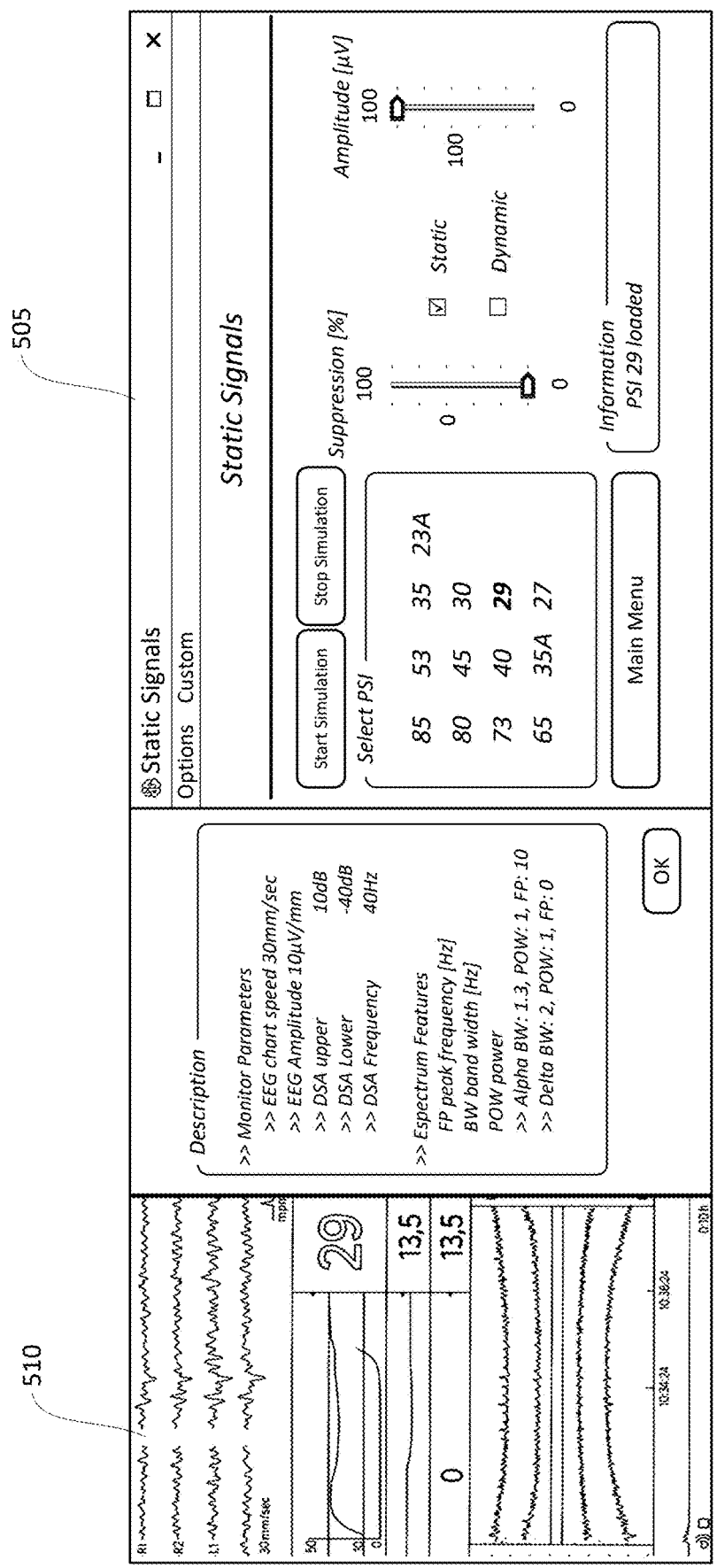
FIG. 5 illustrates a Static Signals user interface, which allows programming of different indices to generate an EEG consistent with a specific anesthetic depth level.

With reference to FIG. 5, in accordance with one aspect of the invention, there is a Static Signals user interface 505 to use and control a Static Signals Mode. This mode presents stable EEG patterns that correspond to different levels of anesthesia. This mode allows programming of different indices to generate an EEG consistent with a specific anesthetic depth level. This may include one or more branded indices like BIS, PSI, Entropy, or Qcon, which represent anesthetic depth on a scale from 0 (indicative of full suppression) to 100 (representative of complete wakefulness). After tapping on any number, the software shows a frame on the projected DSA 510 the monitor would show after 20 minutes simulating the indicated signal.

Figure 6:
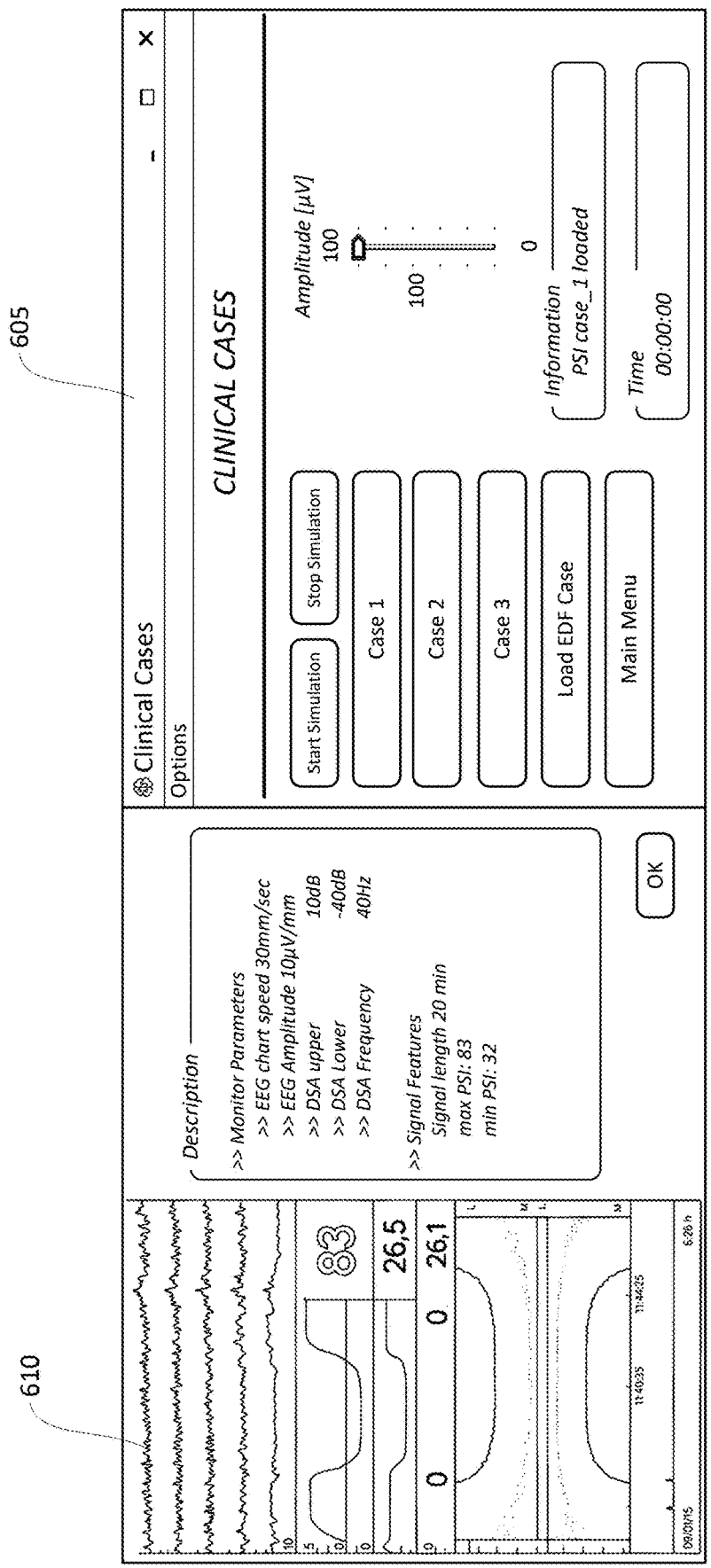
FIG. 6 illustrates a Clinical Cases user interface, offering a list of pre-recorded clinical cases and detailed descriptions.

With reference to FIG. 6, in accordance with one aspect of the invention, there is a Clinical Cases user interface 605 to control and use Clinical Cases Mode. In this mode, there is a list of pre-recorded clinical cases with detailed descriptions and a preview of what a 20-minute segment would resemble on the monitor. Also, tapping on each case opens a frame with the projected DSA 610 the monitor will show after 20 minutes simulating the indicated case.

Figure 7:
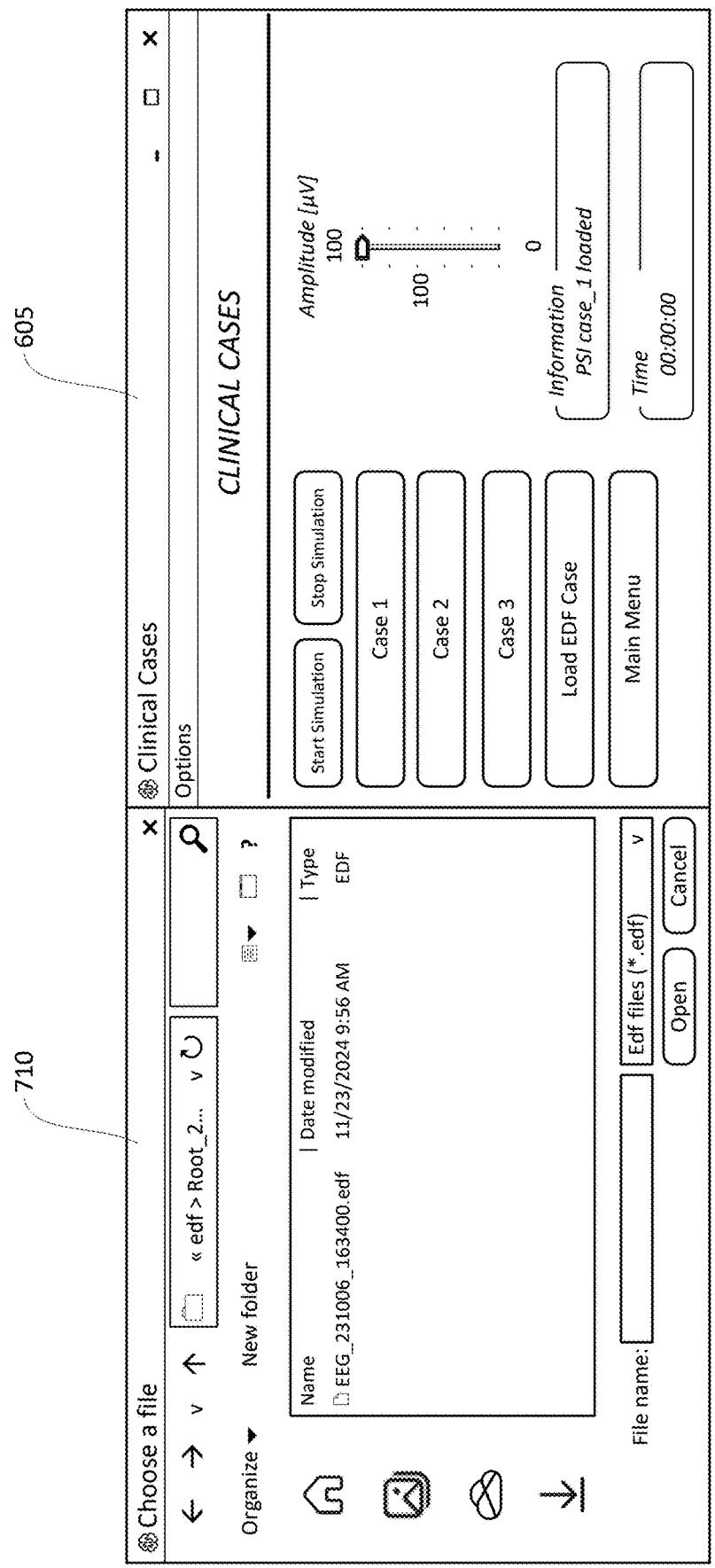
FIG. 7 illustrates an option to upload an EDF.

FIG. 7 illustrates an option 710 to upload an EDF file, enabling the simulator to replicate EEG waveforms from a 2 or 4-channel EEG recording saved in an EDF file.

Figure 8:
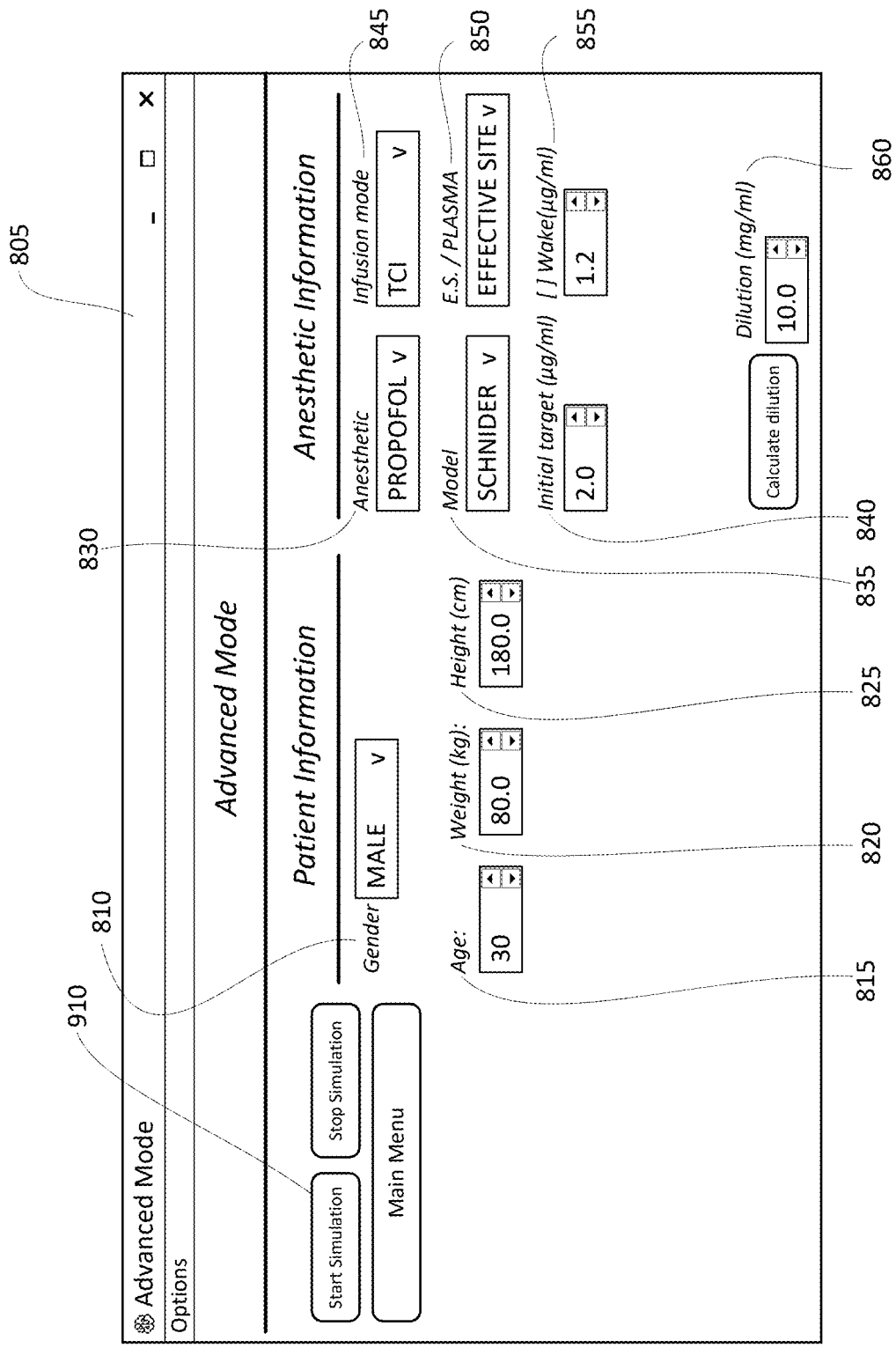
FIG. 8 illustrates an Advanced Mode user interface, which allows simulation of EEG for an adult patient receiving an anesthetic drug.

With reference to FIG. 8, in accordance with one aspect of the invention, there is an Advanced or Expert Mode user interface 805, which allows simulation of EEG for an adult patient receiving an anesthetic drug. The interface provides a selection of drugs, doses, infusion modes, pharmacokinetic models, and concentrations, along with a dynamic pharmacokinetic graph depicting drug concentration over time at the effect site.

Expert Mode user interface 805 may include patient gender input field 810, patient age input field 815, patient weight input field 820, patient height input field 825, anesthetic input field 830, model input field 835, initial target input field 840, infusion mode input field 845, E.S./Plasma (effect site concentration/plasma concentration) input field 850, [ ] Wake (wake concentration) input field 855, and dilution input field 860.

Figure 9:
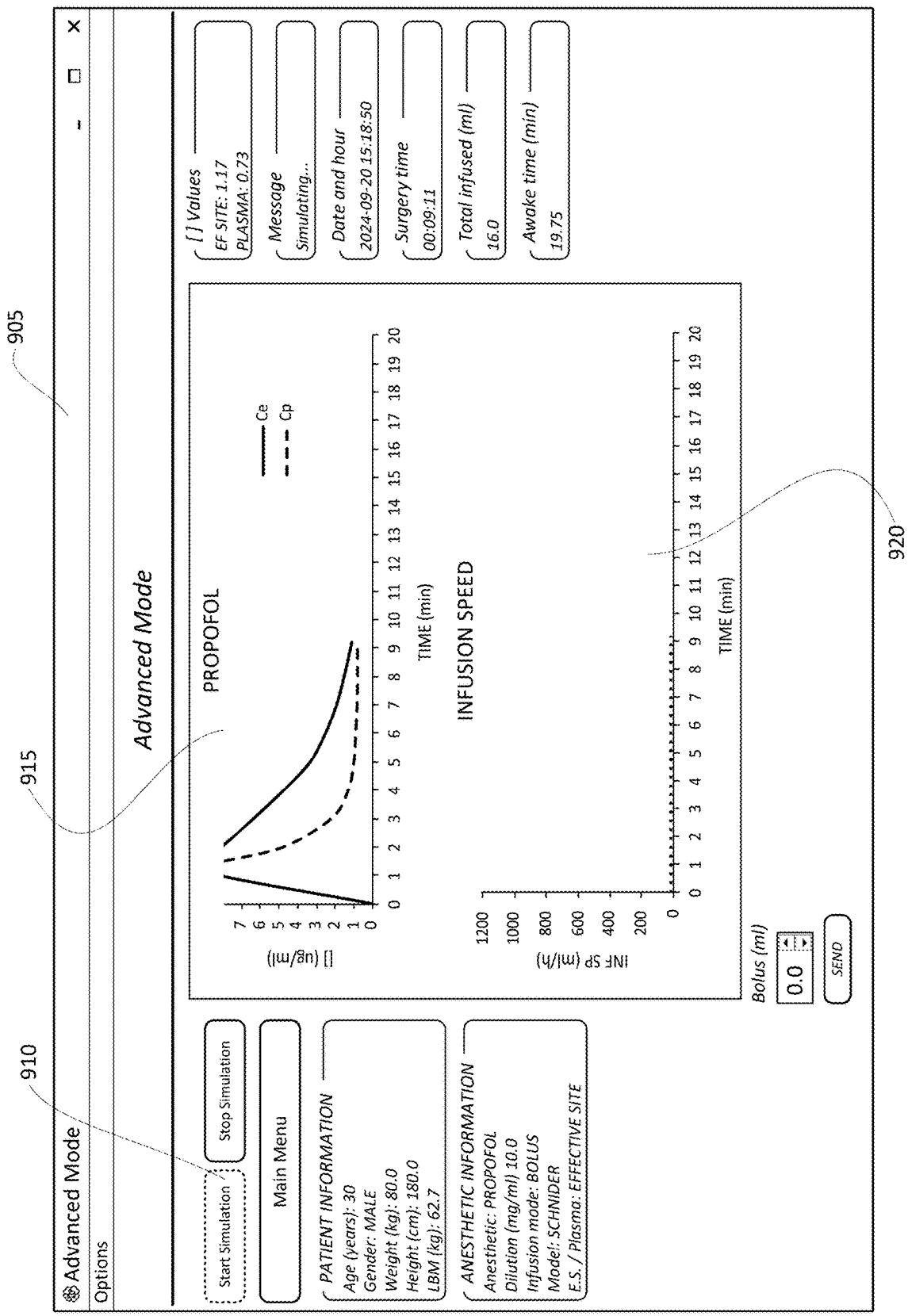
FIG. 9 illustrates an Advanced Mode user interface upon initiation of a simulation sequence, accessible through the 'Start Simulation' button.

FIG. 9 illustrates the Advanced Mode screen upon initiation of the simulation sequence 905, accessible through the 'Start Simulation' button 910. This interface shows real-time graphical representations of the simulated pharmacokinetics 915, including the drug concentration levels in both the plasma and effect site compartments over time, along with a cumulative graph 920 of the total drug amount infused. These simulations are based on user-defined parameters and provide a dynamic graph with temporal distribution and correlate it with EEG impact of anesthetic agents.

Figure 10:
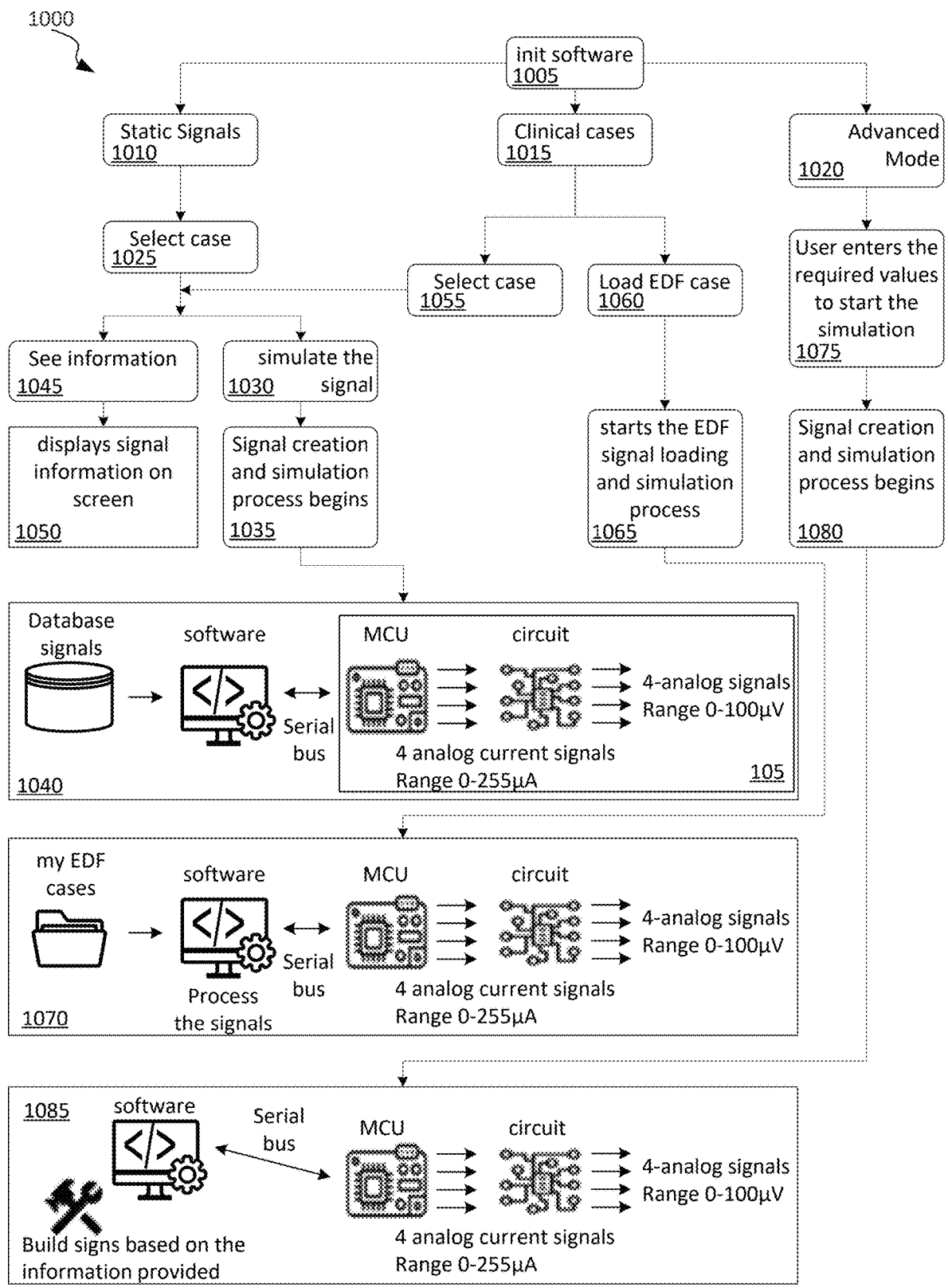
FIG. 10 illustrates an exemplary system architecture in accordance with aspects of the invention.

FIG. 10 illustrates use case and data flows 1000 in accordance with embodiments of the invention. Three operational modes are illustrated: Static Signals 1010, Clinical Cases 1015, and Advanced Mode 1020. FIG. 10 includes a schematic representation of the data flow, highlighting the processes from user input through the GUI (see, e.g., FIGS. 4-9) to the final EEG signal output. In some embodiments, GUI is carried out on UI 135 on external computing device 130. The diagram also illustrates the internal circuits, the Microcontroller Unit (MCU), and the connectivity pathways for the analog outputs. Additionally, it details the serial communication protocol employed when interfacing with an external computing device 130 such as a PC or smartphone.

In Static Signals mode 1010, a user may be prompted at step 1025 to select a case. Once selected, the user can execute step 1045 to see information about the case at step 1050 or can execute step 1030 to simulate the selected signal. The simulation commences at step 1035. Block 1040 illustrates the signal data being obtained from a database to provide to the hardware module 105. In various embodiments, the signal data may be stored in one or more of memory 138, file store 140, database 150, and file store 155.

In Clinical Cases mode 1015, a user may be prompted at step 1055 to select a case. Once selected, the user can execute step 1045 to see information about the case at step 1050 or can execute step 1030 to simulate the selected signal. The simulation commences at step 1035. Block 1040 illustrates the signal data being obtained from a database to provide to the hardware module 105. Alternatively, the user can load an EDF case at step 1060 and start the simulation at step 1065. Block 1070 illustrates the signal data being obtained from "my EDF Cases." In various embodiments, the signal data may be stored in one or more of memory 138, file store 140, database 150, and file store 155.

In Advanced mode 1020, a user may be prompted at step 1075 to enter values (see FIGS. 8 and 9 and accompanying text). Once entered, the system executes step 1080 to generate the simulated signal data and the simulation commences. Block 1085 illustrates the signal data being generated based on the entered values to provide to the hardware module 105.

Anesthetic Drugs: The system includes a comprehensive database modeling the pharmacokinetic and pharmacodynamic profiles of prevalent anesthetic drugs, each known for their distinctive EEG footprints.

Dosing Information: Enhancing the system's clinical relevance, the software is capable of calculating precise dosing regimens based on individual patient parameters such as age, weight, height, and gender. It supports a range of administration methods, from boluses and continuous infusions to target controlled infusions and their combinations.

Utility and Application: The described invention serves as an invaluable resource for training and education in anesthesia monitoring. By simulating realistic EEG patterns and drug effects, it prepares medical professionals for a variety of clinical scenarios, thereby contributing to improved patient outcomes and safety.

What is claimed is:

1. A method for generating simulated EEG signals for anesthesia training, said method comprising on a computing device, the steps of:
providing a UI display on a display of the computing device;
in response to generating a prompt on the UI display, receiving a mode selection indication of a stored signal mode or a generate signal mode;
in response to generating a prompt on the UI display, receiving an indication of selection of a simulation dataset selected from a plurality of datasets representing time-varying simulated digital EEG signal amplitudes for medical subjects under anesthesia and digitized time-varying clinical EEG signal amplitudes for patients under anesthesia if the mode indication is stored signal mode;

in response to generating prompts on the UI, receiving target patient and anesthetic parameters and generating a simulation dataset representing time-varying simulated digital EEG signal amplitudes based on the target patient and anesthetic parameters if the mode indication is generate signal mode; and transmitting the simulation dataset as a digital data stream to an apparatus having a high-resolution integrated Digital-to-Analog converter (DAC) module configured to provide a plurality of analog signal outputs in a range of 0-100 uV and a microcontroller unit (MCU) comprising a processor and memory, said MCU in electrical communication with the DAC module and connected to the computing device, the memory containing MCU executable instructions;

on the MCU, by executing the executable instructions, the steps of:

receiving the digital data stream; and controlling the DAC module to reproduce the time-varying simulated digital EEG signal amplitudes on said plurality of analog signal outputs.

2. The method of claim 1 wherein the target patient and anesthetic parameters include patient gender, patient age, patient weight, patient height, anesthetic, model, initial target, infusion mode, effect site/plasma concentration, and wake concentration.

3. The method according to claim 1 wherein the plurality of datasets is stored in a file store local to the computing device.

4. The method according to claim 1 wherein the plurality of datasets is stored in a file store remote from the computing device.

5. The method according to claim 1 wherein the UI display comprises a DSA display corresponding to the simulation dataset.

6. The method according to claim 1, further comprising a step of:

in response to generating prompts on the UI display, receiving a suppression/amplitude indication comprising one or both of a suppression percentage or amplitude ceiling and modifying the simulation dataset according to the suppression/amplitude indication if the mode indication is stored signal mode.

7. The method according to claim 1, further comprising a step of:

in response to generating prompts on the UI display, receiving a static or dynamic indication and modifying the simulation dataset according to the static or dynamic indication if the mode indication is stored signal mode.

8. The method according to claim 1, further comprising a step of:

displaying on the UI display a dynamic pharmacokinetic graph depicting drug concentration over time at an effect site based on the generated simulation dataset if the mode indication is generate signal mode.

9. The method according to claim 1, further comprising a step of:

displaying on the UI display a cumulative graph of a total drug amount infused based on the generated simulation dataset if the mode indication is generate signal mode.

10. The method according to claim 1, further comprising a step of:

in response to generating prompts on the UI display, receiving a dilution amount and dilution computation indication and modifying the simulation dataset according to the dilution amount and dilution computation indication if the mode indication is generate signal mode.

11. The method according to claim 1, further comprising a step of:

in response to generating prompts on the UI display, receiving a bolus amount and bolus send indication and modifying the simulation dataset according to the bolus amount and bolus send indication if the mode indication is generate signal mode.

* * * * *